(12) United States Patent
Ungar et al.

(10) Patent No.: US 8,624,560 B2
(45) Date of Patent: Jan. 7, 2014

(54) CONTROLLING BATTERY CHARGING BASED ON CURRENT, VOLTAGE AND TEMPERATURE

(75) Inventors: P. Jeffrey Ungar, Sunnyvale, CA (US); Thomas C. Greening, San Jose, CA (US); William C. Athas, San Jose, CA (US); J. Douglas Field, Los Gatos, CA (US); Richard M. Mank, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 606 days.

(21) Appl. No.: 12/480,581

(22) Filed: Jun. 8, 2009

(65) Prior Publication Data

US 2009/0273320 A1 Nov. 5, 2009

Related U.S. Application Data

(63) Continuation-in-part of application No. 12/242,700, filed on Sep. 30, 2008.

(60) Provisional application No. 61/044,160, filed on Apr. 11, 2008, provisional application No. 61/089,246, filed on Aug. 15, 2008.

(51) Int. Cl.
*H02J 7/04* (2006.01)
*H02J 7/00* (2006.01)

(52) U.S. Cl.
USPC ........................... 320/164; 320/132; 320/152

(58) Field of Classification Search
USPC ................. 320/112, 164, 132, 152; 362/183; 429/96; 455/573; 324/432, 433
See application file for complete search history.

(56) References Cited

U.S. PATENT DOCUMENTS

| | | | |
|---|---|---|---|
| 6,040,685 A * | 3/2000 | Tsenter et al. | 320/160 |
| 6,613,480 B1 * | 9/2003 | Hwang et al. | 429/332 |
| 7,248,023 B2 * | 7/2007 | Takezawa et al. | 320/156 |
| 8,093,902 B2 * | 1/2012 | Nishi et al. | 324/427 |
| 8,108,161 B2 * | 1/2012 | Tomura et al. | 702/63 |
| 8,125,185 B2 * | 2/2012 | Takeno | 320/130 |
| 2006/0068272 A1 * | 3/2006 | Takami et al. | 429/62 |
| 2006/0141352 A1 * | 6/2006 | Kato et al. | 429/144 |

* cited by examiner

*Primary Examiner* — Richard V Muralidar
*Assistant Examiner* — Steve T Chung
(74) *Attorney, Agent, or Firm* — Park, Vaughan, Fleming & Dowler LLP

(57) ABSTRACT

Some embodiments of the present invention provide a system that charges a lithium-ion battery. During operation, the system monitors: a current through the battery, a voltage of the battery, and a temperature of the battery. Next, the system uses the monitored current, voltage and temperature to control a charging process for the battery. In some embodiments, controlling the charging process involves: inferring electrode lithium surface concentrations for the battery from the monitored current, voltage and temperature; and applying the charging current and/or the charging voltage in a manner that maintains the inferred electrode lithium surface concentrations for the battery within set limits.

24 Claims, 12 Drawing Sheets

```
// check initial conditions
//
if $T < T_{min}$ or $T > T_{max}$ then do not charge
find $j$ such that $T_j \leq T < T_{j+1}$
if $V_{cell} \geq OCV_{max,j}$ then do not charge
find $i$ such that $V_{j,i-1} \leq V_{cell} < V_{j,i}$
// main charging sequence
//
repeat
      charge with limits $I_{j,i}$ and $V_{j,i}$ for time $\Delta t$
      if $i = m_j$ and voltage-limited break
      if voltage-limited and $I_{j,i+1} < I_{j,i}$ then
          // CV drop to next level
          while voltage-limited
              find $j_1$ such that $T_{j_1} < T < T_{j_1+1}$
              if $j_1 \neq j$ break
              if $I \leq I_{j,i+1}$ break
              charge with limits $I_{j,i}$ and $V_{j,i}$ for time $\Delta t$
      find $j$ such that $T_j \leq T < T_{j+1}$
      find $i$ such that $V_{j,i-1} \leq V_{cell} < V_{j,i}$
// do CV termination
//
while $I > I_{term}$
      find $j$ such that $T_j \leq T < T_{j+1}$
      charge with limits $I_{j,m_j}$ and $OCV_{max,j}$ for time $\Delta t$
```

FIG. 5

```
// check initial conditions
//
if $T < T_{min}$ or $T > T_{max}$ then do not charge
if $V_{cell} \geq OCV_{max}(T)$ then do not charge
find $i$ such that $V_{i-1}(T) \leq V_{cell} < V_i(T)$
// main charging sequence
//
repeat
    charge with limits $I_i$ and $V_i(T)$ for time $\Delta t$
    if $i = m$ and voltage-limited break
    if voltage-limited and $I_{i+1} < I_i$ then
        // CV drop to next level
        while voltage-limited
            if $I \leq I_{i+1}$ break
            charge with limits $I_i$ and $V_i(T)$ for time $\Delta t$
    elseif voltage-limited
        $i \to i + 1$
// do CV termination
//
while $I > I_{term}$
    charge with limits $I_m$ and $OCV_{max}(T)$ for time $\Delta t$
```

FIG. 6

```
// check initial conditions
//
if $T < T_{min}$ or $T > T_{max}$ then do not charge
if $V_{cell} \geq OCV_{max}$ then do not charge
find $i$ such that $V_{i-1} \leq V_{cell} < V_i$
// main charging sequence
//
repeat charge with limits $I_i(T)$ and $V_i$ for time $\Delta t$
    if $i = m$ and voltage-limited break
    if voltage-limited and $I_{i+1}(T) < I_i(T)$ then
        // CV drop to next level
        while voltage-limited
            if $I \leq I_{i+1}(T)$ break
            charge with limits $I_i(T)$ and $V_i$ for time $\Delta t$
    elseif voltage-limited
        $i \rightarrow i + 1$ // do CV termination
//
while $I > I_{term}$ charge with limits $I_m(T)$ and $OCV_{max}$ for time $\Delta t$
```

FIG. 7

CONTROLLING BATTERY CHARGING BASED ON CURRENT, VOLTAGE AND TEMPERATURE

RELATED APPLICATIONS

This application is a continuation-in-part of, and hereby claims priority under 35 U.S.C. §120 to, U.S. patent application Ser. No. 12/242,700 ("parent application") filed 30 Sep. 2008, entitled "Adaptive Surface Concentration Battery Charging," by inventors Thomas C. Greening, P. Jeffrey Ungar and William C. Athas. This parent application claims priority under 35 U.S.C. §119 to U.S. Provisional Patent Application No. 61/044,160 filed 11 Apr. 2008, entitled "Diffusion-Limited Adaptive Charging," by inventors Thomas C. Greening, P. Jeffrey Ungar and William C. Athas. This parent application also claims priority under 35 U.S.C. §119 to U.S. Provisional Patent Application No. 61/089,246 filed 15 Aug. 2008, entitled "Adaptive Surface Concentration Charging," by inventors Thomas C. Greening and P. Jeffrey Ungar.

BACKGROUND

1. Field

The present invention generally relates to techniques for charging a battery. More specifically, the present invention relates to a technique for charging a lithium-ion battery, wherein the technique controls a lithium surface concentration in the battery based on measurements of current, voltage and temperature during the charging process.

2. Related Art

Rechargeable lithium-ion batteries are presently used to provide power in a wide variety of systems, including laptop computers, cordless power tools and electric vehicles. FIG. 11 illustrates a typical lithium-ion battery cell, which includes a porous graphite electrode, a polymer separator impregnated with electrolyte, and a porous cobalt dioxide electrode. The details of the transport of lithium and lithium ions in and out of the electrode granules and through the material between them are complex, but the net effect is dominated by slow diffusion processes for filling one electrode with lithium while removing it from the other.

Note that FIG. 11 provides a physical model for the layout of a typical lithium-ion cell, wherein the oxidation and reduction processes that occur during charging are also illustrated. The physical model shows the current collectors, which are in turn connected to the battery terminals; the polymer separator; and the positive and negative porous electrodes. Note that an electrolyte permeates the porous electrodes and the separator.

The negative electrode includes granules of graphite held together with a conductive binder (in practice, there may also be a nonconductive binder). Surrounding each graphite particle is a thin passivating layer called the solid-electrolyte interphase (SEI) that forms when a fresh cell is charged for the first time from the lithium atoms in the graphite reacting directly with the electrolyte. This occurs because the tendency for the lithium atoms to remain in the graphite is relatively weak when the cell is fully charged, but after the SEI is formed, the SEI acts as a barrier against further reactions with the electrolyte. Nevertheless, the SEI still allows transport of lithium ions, albeit with some degree of extra resistance.

The positive electrode includes granules of lithiated cobalt dioxide held together with binders similar to the negative electrode. Any SEI-like layer surrounding these particles is likely to be of much less significance than in the negative electrode because lithium atoms strongly favor remaining in these particles rather than leaving and reacting directly with the electrolyte.

Lithium transport in the negative graphite electrode (also referred to as the "transport-limiting electrode") is slower than in the positive cobalt dioxide electrode (also referred to as the "non-transport-limiting electrode"), and therefore limits the maximal speed of charging. During charging, the slow diffusion causes a transient build-up of lithium on the surfaces of the graphite that varies in direct proportion to the charging current and a characteristic diffusion time.

The diffusion time is typically on the order of hours and has a strong dependence on temperature and other variables. For instance, a cell at 15° C. can have a diffusion time which is ten times slower than a cell at 35° C. The diffusion time can also vary significantly between cells, even under the same environmental conditions, due to manufacturing variability.

If the concentration of lithium at the surface reaches the saturation concentration for lithium in graphite, more lithium is prevented from entering the graphite electrode until the concentration decreases. A primary goal of conventional battery-charging techniques is to avoid lithium surface saturation, while keeping the charging time to a minimum. For example, one conventional technique charges at a constant current until a fixed upper voltage limit (e.g., 4.2 V) is reached, and then charges by holding the voltage constant at this upper limit until the current tapers to some lower limit. Note that it is common practice to express all currents in terms of the cell capacity. For example, for a cell with a capacity of $Q_{max}$=2500 mA·hr, a "1 C" current would be 2500 mA. In these units, the constant current charging is usually done at less than 1 C (e.g., 0.3 C), and the constant voltage phase is terminated when the current tapers to some value less than 0.05 C.

A significant challenge in charging lithium-ion batteries is to avoid lithium surface saturation at a transport-limiting electrode, while keeping the charging time to a minimum. Some battery-charging techniques, such as Adaptive Surface Concentration Charging (ASCC), avoid lithium surface saturation during the charging process by adapting to the dynamics of lithium transport in a battery through closed-loop control of estimated single electrode potentials (or, equivalently, estimates of lithium concentration at the surfaces of the electrodes.) For example, see U.S. patent application Ser. No. 12/242,700, filed 30 Sep. 2008, entitled "Adaptive Surface Concentration Battery Charging," by inventors Thomas C. Greening, P. Jeffrey Ungar and William C. Athas, which is hereby incorporated herein by reference.

During the charging process, one implementation of ASCC estimates the electrode potentials from the cell's state of charge, the measured single electrode potential curves for a typical cell, and cell impedance data. Note that these ASCC techniques are more general than any specific model used to estimate the electrode potentials, because they account for the fact that at any state of charge there is a minimum charging voltage, where the cell will not charge, and a maximum charging voltage, where the cell will be overdriven and experience a shortened service life. These are illustrated by the "no charging" and "maximum charging" lines on FIG. 1. The desired target charging voltage is shown as a line between these limits. For example, charging at the cell's open circuit voltage (OCV) will come to a halt once transients have decayed. On the other hand, charging at the maximum limit voltage may drive a graphite negative electrode to conditions where the lithium surface concentration quickly reaches saturation. These two extremes define the maximum margin for error in the fractional state of charge q in the neighborhood of an estimated q, shown as Δq in FIG. 1.

Note that the full state of charge margin Δq is typically greater than 10% over most of the state of charge range, although it can be narrower than this at high states of charge, depending on the chemistry and the loading of the electrodes. Some of this margin can be used to compensate for cell manufacturing variations, including localized variations in internal cell properties. Furthermore, if the estimated state of charge is lower than the true value, the calculated target charging voltages will be closer to the "no charging" line, which results in long and highly variable charging times. For best performance, the state of charge should be known to within approximately ±1%.

Unfortunately, this requirement is beyond the capabilities of commonly available battery systems. These systems employ bookkeeping strategies to combine state of charge measurements (based on relaxed OCV values) with coulomb counting and the coulomb capacity $Q_{max}$. However, a host of issues, including cell OCV hysteresis, slow cell relaxation, lack of cell isolation, and infrequent updates to $Q_{max}$, prevent them from doing much better than ±4% in practice.

Hence, what is needed is a technique that does not require accurate measurements of a battery's state of charge in order to charge consistently and to keep the electrode lithium surface concentrations (and potentials) within specified limits, at least for typical cells that meet or exceed certain transport rate capabilities.

SUMMARY

Some embodiments of the present invention provide a system that charges a lithium-ion battery. During operation, the system monitors: a current through the battery, a voltage of the battery, and a temperature of the battery. Next, the system uses the monitored current, voltage, and temperature to control a charging process for the battery, wherein the charging process can involve controlling a charging current and/or a charging voltage.

In some embodiments, controlling the charging process involves: inferring electrode lithium surface concentrations for the battery from the monitored current, voltage, and temperature; and applying the charging current and/or the charging voltage in a manner that maintains the inferred electrode lithium surface concentrations within set limits. (For example, the inferred electrode lithium surface concentration can be maintained below a maximum value, above a minimum value, or between a maximum and a minimum value.)

In some embodiments, while controlling the charging process the system receives a charging profile comprising a set of data points, wherein each data point specifies a current, a voltage, and a temperature for the battery, and wherein the specified current, voltage and temperature are associated with a maximum lithium surface concentration for the battery during the charging process. Next, the system uses interpolation to compare the monitored current, temperature and voltage for the battery against a surface defined by the set of data points, wherein the surface is associated with a maximum lithium concentration for the battery. Finally, the system uses results of the comparison to adjust the charging current and/or the charging voltage to maintain the electrode lithium surface concentrations of the battery below the maximum lithium surface concentration during the charging process.

In some embodiments, adjusting the charging current and/or the charging voltage involves applying a constant charging current to the battery until the monitored voltage reaches a maximum voltage, wherein the maximum voltage maintains the electrode lithium surface concentrations of the battery below the maximum lithium surface concentration given the constant charging current and the monitored temperature. It can also involve applying a constant charging voltage to the battery until the monitored current relaxes to a lower current, wherein the lower current maintains the electrode lithium surface concentrations of the battery below the maximum lithium surface concentration given the constant charging voltage and the monitored temperature.

In some embodiments, prior to receiving the charging profile, the system generates the charging profile by taking measurements, including voltage, current, and temperature, while charging a reference battery, which is similar to the battery. These measurements are then used to estimate the electrode lithium surface concentrations of the battery during the charging process. (Note that a reference battery can be a battery with one or more cells in which at least one cell contains a reference electrode. Moreover, a reference battery may or may not have cells which include reference electrodes, but there should ideally exist some way to measure the single electrode potentials for the materials used to build the cells in the reference battery (with respect to a specified reference electrode). A cell in a reference battery is referred to as a "reference battery cell."

In some embodiments, taking the measurements involves determining the potentials of the working electrodes with respect to a reference electrode, such as one made of metallic lithium and immersed in the same electrolyte. In these embodiments, estimating the electrode lithium surface concentrations involves using the determined working electrode potentials with respect to the reference electrode to estimate the electrode lithium surface concentrations.

In some embodiments, determining the potential of the working electrodes with respect to a reference electrode involves directly measuring these potentials with respect to an integral reference electrode that is built into a reference battery cell in the reference battery.

In some embodiments, while determining the potentials of the working electrodes with respect to a reference electrode, the system first determines a state of charge for the reference battery, and then determines the working electrode potentials with respect to the reference electrode from the determined state of charge and other parameters related to the reference battery.

In some embodiments, the battery is a lithium-ion battery which includes: a transport-limiting electrode governed by diffusion; an electrolyte; a separator permeated with the electrolyte; and a non-transport-limiting electrode.

In some embodiments, the transport-limiting electrode is a negative electrode, and the non-transport-limiting electrode is a positive electrode.

In some embodiments, the negative electrode is comprised of graphite and/or $TiS_2$; the electrolyte is a liquid electrolyte comprised of $LiPF_6$, $LiBF_4$ and/or $LiClO_4$ and an organic solvent; and the positive electrode is comprised of $LiCoO_2$, $LiMnO_2$, $LiFePO_4$ and/or $Li_2FePO_4F$.

BRIEF DESCRIPTION OF THE FIGURES

FIG. 5 illustrates a general I-V-T charging technique that uses discretized cell-adaptive profiles in accordance with an embodiment of the present invention.

FIG. 6 an exemplary I-V-T charging technique in accordance with an embodiment of the present invention.

FIG. 7 illustrates another exemplary I-V-T charging technique in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Ideal Charging Profile

Figure 1:
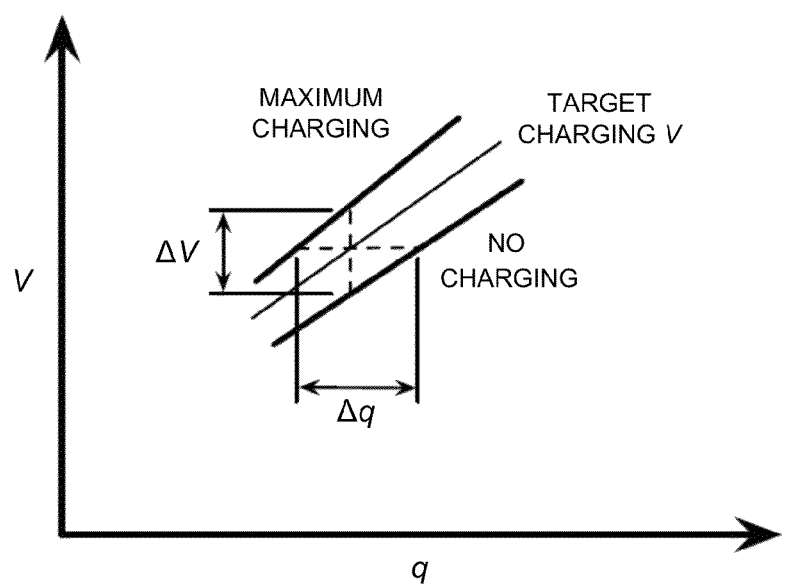
FIG. 1 illustrates a voltage margin for charging.
Figure 2:
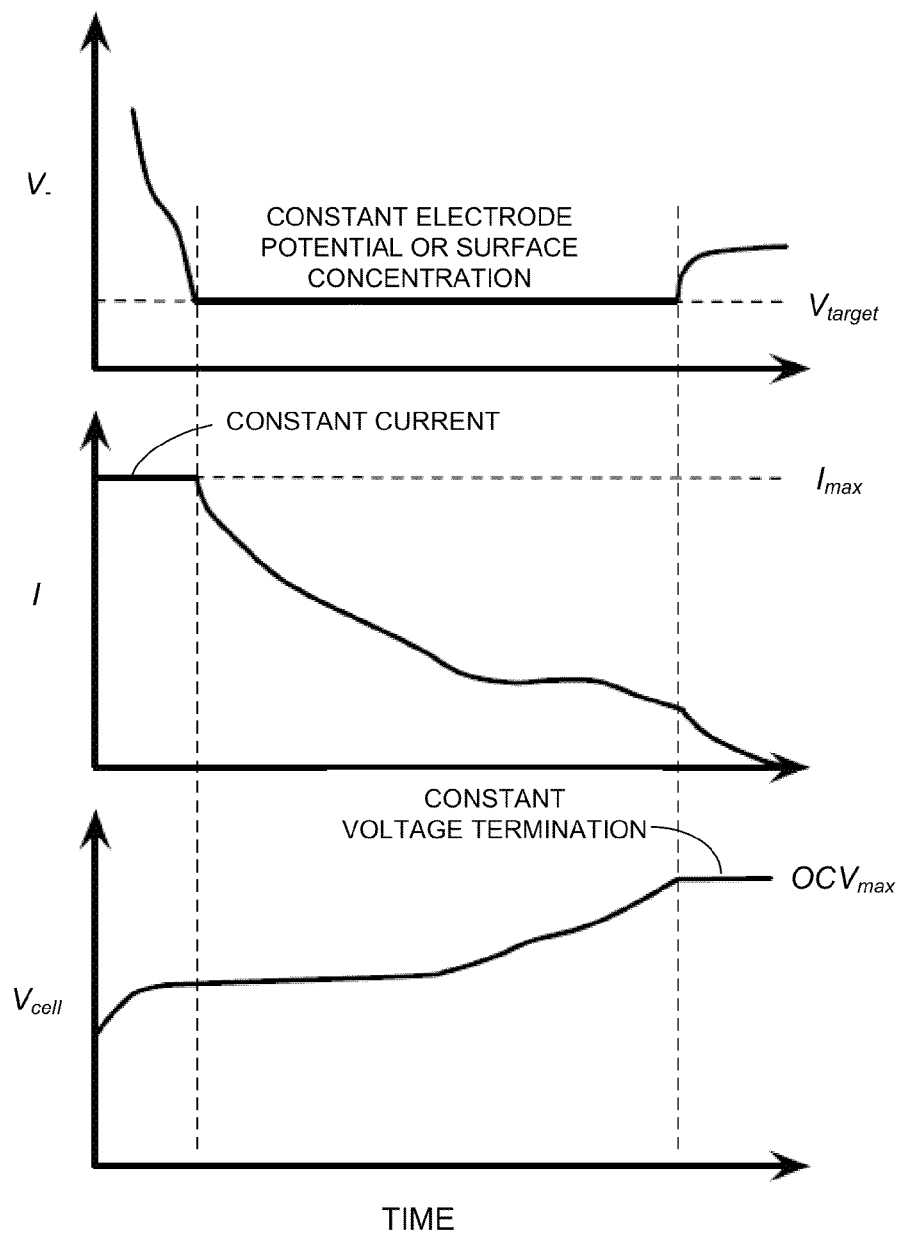
FIG. 2 illustrates an ideal ASCC charging profile in accordance with an embodiment of the present invention.

FIG. 2 shows an ideal ASCC profile for charging a lithium-ion cell from empty to full at a fixed temperature with a current limit $I_{max}$, a negative electrode surface potential target $V_{target}$, and an optional constant voltage termination at $OCV_{max}$. For clarity, we illustrate the case where the charging is controlled to keep the negative electrode potential at or above a minimum value $V_{target}$, but the generalization to keeping both electrode potentials within specified limits is straightforward. (Note that these limits correspond to lithium concentration limits, which would be a maximum concentration for a graphite negative electrode, but may be a minimum concentration for a $LiCoO_2$ positive electrode.) Three charging phases are shown in FIG. 2: (1) a current-limited phase, (2) a constant-electrode-potential phase, and (3) a constant-voltage-termination phase. In principle, if $I_{max}$ is sufficiently large, the current will never reach $I_{max}$ and there will never be a constant current phase, but usually $I_{max}$ is not so large. Charging then proceeds with the surface concentration held fixed at a value corresponding to the idealized negative electrode potential $V_{target}$ until a termination phase begins. Without loss of generality, FIG. 2 illustrates a constant cell voltage termination which brings the cell to a relaxed OCV of $OCV_{max}$.

None of the discussion that follows requires exact knowledge of the ideal ASCC charging profile. Any ASCC technique that manages the electrode potentials with a suitable margin for error may be used. On the other hand, if cells with integral reference electrodes are used to do the ASCC charging, corrections to the measured single electrode potentials may be applied to achieve a profile which approaches an ideal profile.

Figure 3A:
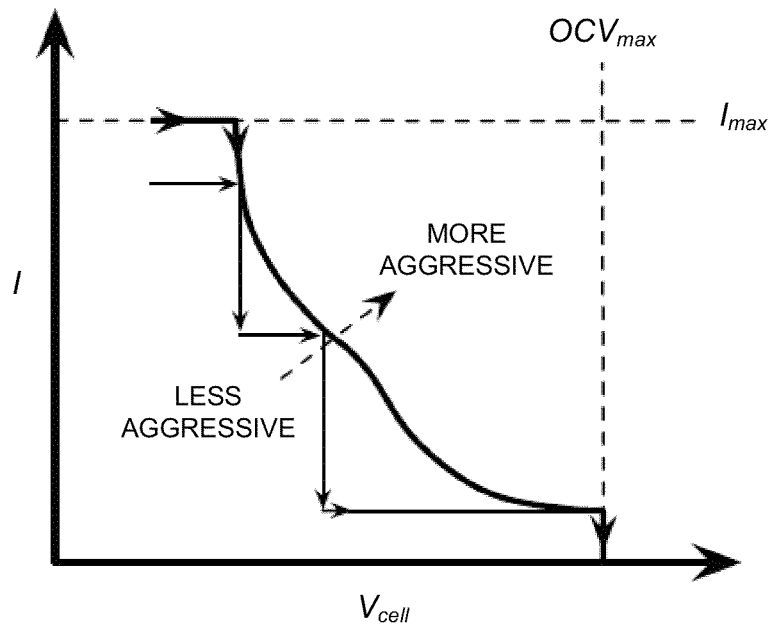
FIG. 3A illustrates an ASCC charging profile at a fixed temperature in accordance with an embodiment of the present invention.

The charging profile illustrated in FIG. 2 can be interpreted as a trajectory in cell current and voltage as is shown in FIG. 3A, which illustrates an ASCC charging profile at a fixed temperature T as an I-versus-$V_{cell}$ trajectory (thick path). Note that any charging profile with a trajectory in the lower left region is less aggressive than this ASCC profile. These less-aggressive charging profiles will tend to keep $V_->V_{target}$. One such trajectory, a multi-step, constant-current, constant-voltage scheme is illustrated in FIG. 3A as a thin path. On the other hand, all trajectories that lie above and to the right of the ASCC trajectory are more aggressive and will tend to allow $V_-<V_{target}$ during the charging process.

Figure 3B:
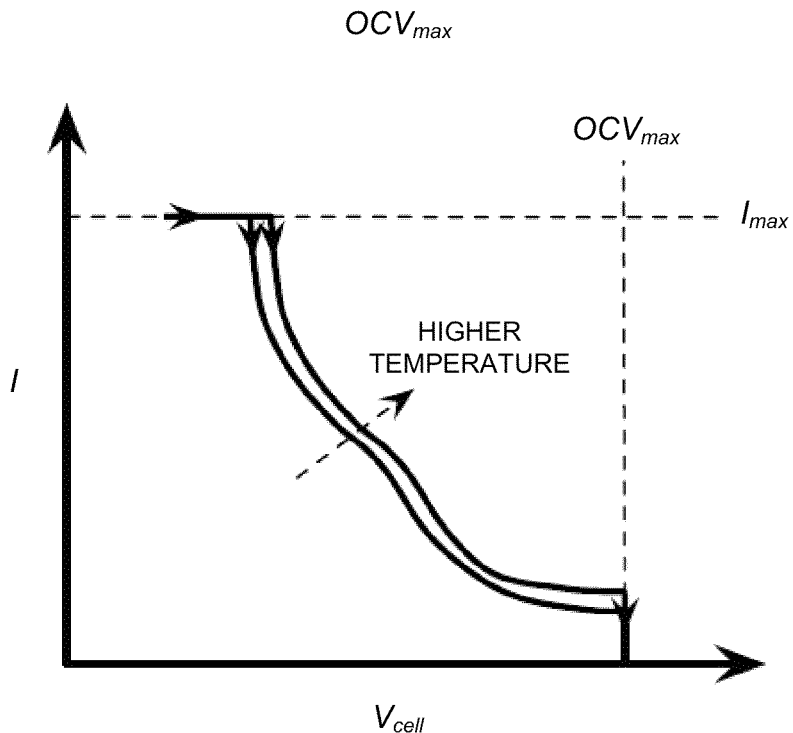
FIG. 3B illustrates ASCC charging trajectories at different temperatures in accordance with an embodiment of the present invention.

One embodiment of the present invention constructs an approximation to the ideal charging trajectory that lies in the less aggressive region. For example, the multi-step, constant-current, constant voltage (CC/CV) path represented by the thin lines in FIG. 3A is a suitable approximation of the ASCC path for an associated temperature. The ASCC paths at higher temperatures allow faster charging, as shown in FIG. 3B, which illustrates ASCC charging trajectories at different temperatures. Note that a higher temperature path tends to lie on the aggressive side of a lower temperature path. Similar constructions for ASCC paths associated with different temperatures can be combined to form a comprehensive charging scheme that only requires in-system telemetry for the cell current, voltage, and temperature. In the following discussion, we refer to these schemes as "I-V-T charging."

Figure 4A:
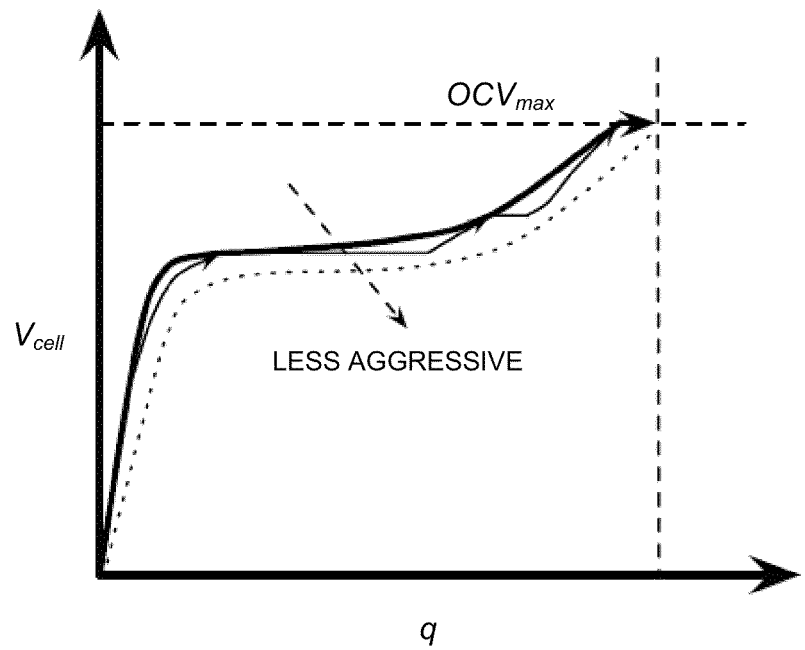
FIG. 4A illustrates an ASCC charging profile at a fixed temperature in accordance with an embodiment of the present invention.
Figure 4B:
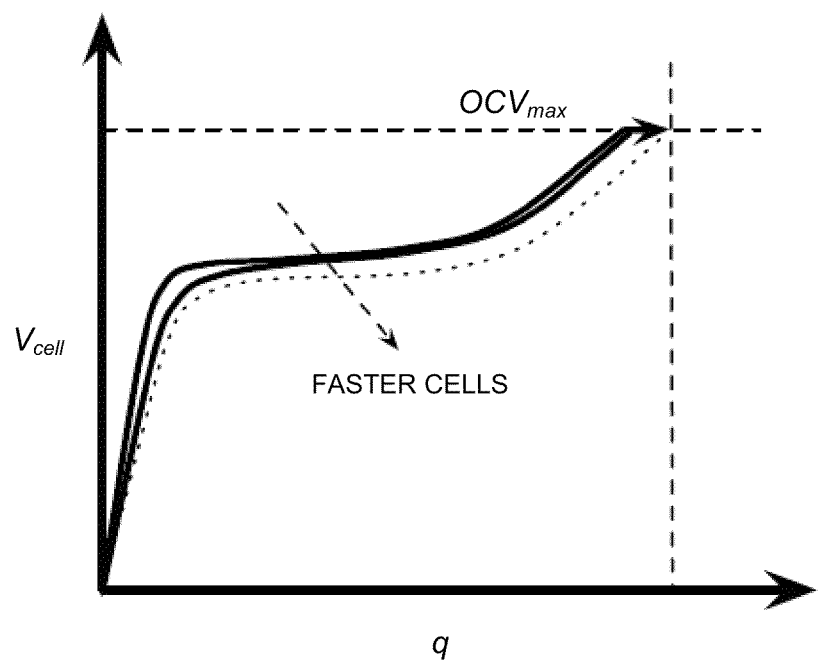
FIG. 4B illustrates ASCC charging trajectories for different cells in accordance with an embodiment of the present invention.

The ASCC profile can also be represented as a trajectory in cell voltage and state-of-charge, as is shown in FIG. 4A, which illustrates an ASCC charging profile at a fixed temperature T as a $V_{cell}$ versus state-of-charge q trajectory represented by the thick path. Profiles below this line are less aggressive for this cell, such as the multi-step CC/CV path illustrated in FIG. 3A, which corresponds to the thin path. Realizable charging trajectories lie above the dotted curve, which is the cell OCV curve. It is more interesting to consider the converse, that is, how the ASCC trajectory for a fixed temperature varies with transport rates for cells of the same electrode chemistry and loading. Faster cells will follow a path that is below and to the right of a nominal cell, as shown in FIG. 4B. Therefore, one way to screen a production cell for a simpler I-V-T charging technique is to perform a cell-adaptive ASCC charge on it and show that its trajectory lies in the "faster" region relative to that for a nominal cell. In practice, we can instead run the I-V-T technique and ensure that its trajectory lies below the nominal ASCC path in V-q space. A complete screen will test the cell at a variety of temperatures, which cover the planned operational range. From this standpoint, the best way to increase the cell production yield for the screen is to adjust the I-V-T charge to move toward the less-aggressive region.

Details

Hence, the present invention provides: (1) a technique for measuring cell-adaptive charging profiles; (2) a technique for constructing an I-V-T charging scheme based on these profiles; and (3) a technique for screening production cells to ensure the I-V-T charging scheme is conservative with respect to the measured cell-adaptive charging profiles. In the following sections, we first discuss techniques to measure currents and voltages, and then provide a detailed description of the above-listed techniques.

Current and Voltage Adjustments

A good way to adjust the current measurements is to express them in terms of the "C-rate" of 1 C=1 $Q_{max}$/hour. Transferability to cells with different capacities is then trivial: just use each cell's C-rate.

Voltages can be used without modification. However, better performance, adaptability, and consistency may be attained by making small adjustments. In practice, there will be contributions to the cell voltage or to the single electrode potential measurements from purely ohmic resistance drops, charge transfer resistance drops through passivating films, diffusion potentials from ion concentration gradients in the electrolyte, potentials arising from the kinetics of the redox reactions occurring at the electrode material surfaces, and other sources.

Electrochemical impedance spectroscopy (EIS) is one technique that may be used to measure these contributions in detail, but simpler estimates may suffice. For example, if (as is usually the case) the charging current changes slowly compared to the relaxation times for these contributions to the potential, the charging current may be assumed to be constant. In an equivalent circuit model of the cell, the capacitive elements will then behave as open circuits and the net impedance will be resistive. Stepping the current to zero quickly allows a direct measurement of the total resistive drop, and hence the total series resistance. Another approach is to measure the purely ohmic resistance as the real part of the small signal impedance at high frequency (1 kHz is usually suitable), which is already a common practice for characterizing cells. The ohmic component is a portion of the total series resistance (perhaps up to half), and accounting for it is straightforward and effective. In fact, for any resistive correction, we simply use the adjusted voltage $\tilde{V}=V-IR$.

Any basic impedance characterization of the cell to allow small adjustments to measured potentials can be done for various states of charge from empty to full and for temperatures across the operating range. The most elaborate adjustments can be made when using a reference electrode to obtain cell-adaptive profiles. Simpler adjustments are more appropriate for the I-V-q charging trajectories, because the intent is for the same kind of adjustments to be done in the target systems, which often can track some cell resistance properties.

Obtaining Cell-Adaptive Charging Profiles

For the techniques described below, the idea is to build up a set of profiles that covers the range of temperatures in which charging will occur. These profiles can be measured using a technique that provides significantly greater accuracy and functionality than what is presently available in the target systems that will host the batteries. As discussed above, the charging profiles can be represented as paths in the I-V and V-q planes.

In one embodiment, the profile measurement system can be programmed to set current and voltage limits for charging, which can be adjusted dynamically according to the evolving state of the cell under test. The system can determine an accurate running state of charge by coulomb counting from a well defined reference state. The coulomb capacity itself is obtained by coulomb counting between the fully charged and fully discharged states, which correspond to relaxed OCVs of $OCV_{max}$ and $OCV_{min}$, respectively. This is achieved through a CC/CV charge to $OCV_{max}$, followed by termination at a small taper current $I_{min}$, and then a CC/CV discharge to $OCV_{min}$ with termination at a small taper current, which can be taken as $I_{min}$ without loss of generality. For typical cells, $I_{min} \approx C/1000$ yields $Q_{max}$ to an accuracy of about ±0.1%. Note that the so-called "discharge" capacity thus obtained is the same as the "charge" capacity (obtained by coulomb counting to the top from the bottom), so long as electrode hysteresis effects are small at the endpoints. Typical cells show equal capacity values within the accuracy of the measurement procedure. With an accurate $Q_{max}$ available, the coulomb count Q charging up from the well-defined bottom ($OCV_{min}$, tapered to $I_{min}$) produces a value for the state of charge $q=Q/Q_{max}$ to about the same accuracy.

One embodiment of the measurement system may also add functionality to measure the voltage of the electrodes with respect to integral reference electrodes, and to respond dynamically to the measurements, such as ceasing charge if a specified limit is reached, or otherwise altering the course of charging.

We now describe methods for obtaining such cell-adaptive charging profiles. One method is to apply ASCC directly to a cell with an integral reference electrode, and to use the measured single electrode potentials to control the charging. If there were no sources of potential drops in the directly measured values, this would produce an ideal charging profile, such as the one illustrated in FIG. 2. In practice, we may apply some of the resistive corrections described above to the reference electrode measurements as an optimization. If no correction is made, the profiles will be somewhat more conservative, but otherwise perfectly appropriate for constructing I-V-T charging schemes. One embodiment of the system implements a feedback controller which keeps the measured electrode potentials, including any applied adjustments, at or within specified limits as described in U.S. patent application Ser. No. 12/242,700.

Another technique is to apply an advanced state-of-charge-based ASCC technique to a cell. In this case, the cell need not have an integral reference electrode, although the relaxed single electrode potentials should be determined through some other technique. Implementation of advanced ASCC is straightforward: within a current limit $I_{max}$ charge the cell to a calculated target voltage V (q, I, T), which allows for resistive adjustments through measurement of the actual charging current. This is described in more detail in U.S. patent application Ser. No. 12/242,700. An advantage of this technique is that one can gather data from a larger population of cells since they do not have to have reference electrodes.

Figure 9:
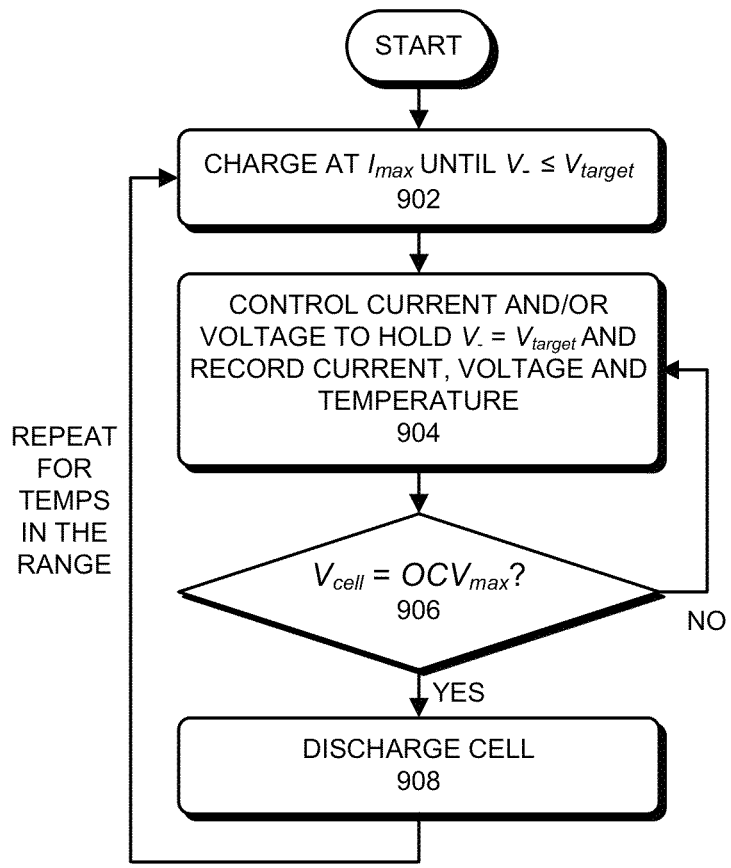
FIG. 9 presents a flow chart illustrating the process of generating limits for a charging profile in accordance with an embodiment of the present invention.

In summary, the above-described system can determine charging profiles through the process illustrated by the flow chart illustrated in FIG. 9. First, the system charges a reference battery, which includes a reference battery cell containing a reference electrode at a maximum current $I_{max}$ until the potential of a reference electrode V is less than or equal to a target voltage $V_{target}$ (step 902). Note that $V_{target}$ can be set to ensure that a lithium surface concentration in the reference battery cell does not exceed a maximum lithium surface concentration. Also recall that $V_{target}$ can either be directly measured (if a direct connection to the reference electrode exists), or can be estimated based on accurate measurements of the state of charge for the reference battery cell. Next, the system controls the charging current and/or voltage to hold $V_- = V_{target}$ and records the current, voltage and temperature for the reference battery cell (step 904). Next, $V_{cell}$ is compared against $OCV_{max}$ (step 906). If $V_{cell}$ is less than $OCV_{max}$, step 904 is repeated. Otherwise, if $V_{cell} = OCV_{max}$, the cell is discharged (step 908) and the process is repeated for other temperatures in a desired temperature range.

Constructing I-V-T Charging Schemes

With the cell-adaptive profiles in hand for a set of temperatures, we can take each profile and discretize it into an ordered sequence of (V, I) points. For each temperature we define the sequence $$(V_1, I_1), \ldots (V_m = OCV_{max}, I_m); I_{term} \quad (1)$$

which is ordered so that $V_{i+1} > V_i$. The last point has $V_m = OCV_{max}$ in preparation for a constant voltage charge terminating at $I_{term}$, although other termination schemes can be used. The points $(V_i, I_i)$, $i=1 \ldots m$ may lie on the profile or in the less aggressive region. Usually, the currents will also be decreasing, i.e., $I_{i+1} < I_i$, but this is not strictly required. For brevity, we represent all the sequences collected for all temperatures $T_j$, $j=1 \ldots n$ as $$(V_{ji}, I_{ji}); I_{term}. \quad (2)$$

For each j, i=1 ... $m_j$, and for the purposes of technique description, we take $V_{j0} = 0$ and $V_{jmj} = OCV_{max,j} = OCV_{max}(T_j)$.

One I-V-T charging technique that directly uses discretized cell-adaptive profiles is shown in FIG. 5. This technique starts by checking to see if the temperature and cell voltage are within range to begin charging, and exits the procedure if they are not. Otherwise, it proceeds to charge having determined which temperature profile to use as well as which step within the profile to start from. The main charging sequence ends when conditions to begin a CV termination phase are met. Otherwise, the technique proceeds for each time interval $\Delta t$ by charging with the step's current and voltage limits.

Note that each I-V-T step can have a joint current limit and voltage limit. In one embodiment, a step completes when one of two conditions is met. These conditions are: (1) the step has reached the voltage limit, the next step's current limit is less than the present step's current limit, and the current has decayed to the next step's current limit; and (2) the step has reached the voltage limit and the next step's current limit is greater than this step's current limit. The second situation can happen for cell chemistries and designs that show slower transport somewhere at intermediate states of charge. In this case it is possible to speed up charging for a while until even higher voltages are reached.

The main charging sequence allows for changing temperatures through periodic determination of j and i. In practice, charging will also stop if the temperature drifts out of the range $[T_{min}, T_{max}]$ at any time.

We can simplify the profiles by making them have the same number of steps for each temperature, $m_j = m$ for all j, and further fixing either the current limits or the voltage limits. For example, with fixed current limits, the sequences are $$(V_{ji}, I_i); I_{term} \quad (3)$$

which can, in turn, be represented simply as $$(V_i(T), I_i); I_{term} \quad (4)$$

The $V_i(T)$ can be purely table-driven as before, or they can be provided as continuous functions of T by fitting curves to the discrete profile data. Charging techniques based on the simplified discrete profiles may, in turn, be more straightforward to devise. FIG. 6 shows an I-V-T charging technique that uses a set of discrete profiles with the same number of steps where the current limits have been held fixed and the voltage limits are functions of temperature. This is a modification of the general technique in FIG. 5. For completeness, we also show an I-V-T charging technique that uses profiles with the same number of steps and also uses fixed voltage limits and current limits that are functions of temperature in FIG. 7.

As discussed above, we may improve performance and transferability by expressing all currents in terms of the cell's C-rate and by making small impedance-related adjustments to the cell voltage. A discrete I-V-T charging method, such those described in FIGS. 5, 6, and 7, can easily incorporate these same modifications in its profiles and in its use of the cell voltage and current while charging.

Figure 10:
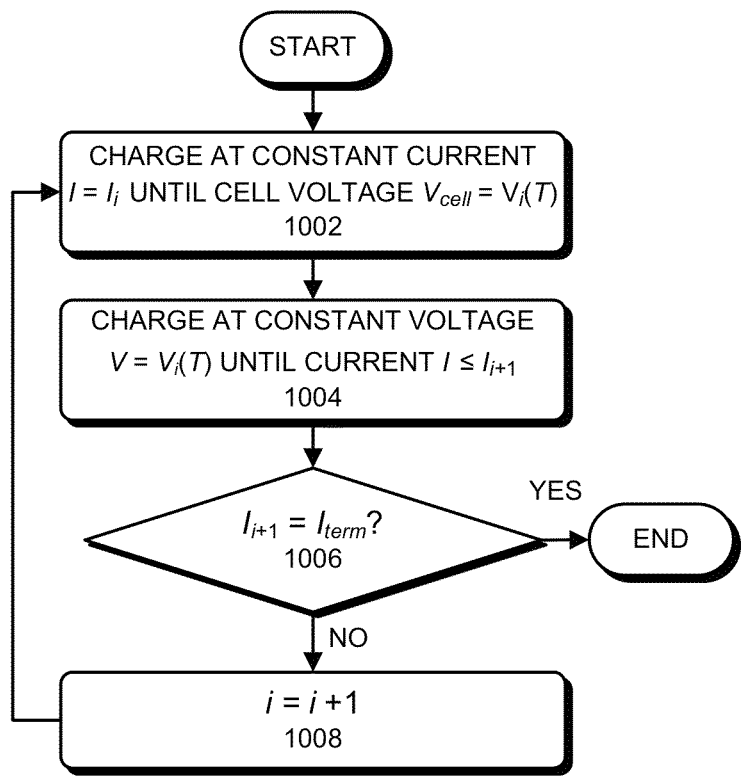
FIG. 10 presents a flow chart illustrating the charging process in accordance with an embodiment of the present invention.

In summary, the system can charge the battery cell through the process illustrated by the flow chart in FIG. 10. First, the system charges the battery cell at a constant current $I = I_i$ until the cell voltage $V_{cell} = V_i(T)$ (step 1002). Next, the system charges at a constant voltage $V = V_i(T)$ until the charging current $I \le I_{i+1}$ (step 1004). Then, the system determines if $I_{i+1}$ equals a terminal current $I_{term}$ (step 1006). If so, the process is complete. Otherwise, the counter variable i is incremented, i=i+1 (step 1008), and the process repeats.

Automatic I-V-T Charging Scheme Construction

It is also possible to construct a discrete I-V profile for one temperature in a single charge of a cell. One technique is to specify in advance a descending list of suitable current limits, $I_i$, i=1 ... m, with $I_i > I_{i+1}$. For example, we might take $$\{I_i\} = \{0.5C, 0.4C, 0.3C, 0.2C, 0.1C\} \quad (5)$$

To this we add the cell OCV for bottom and top of charge, $OCV_{min}(T)$ and $OCV_{max}(T)$, respectively, a termination current $I_{term}$, and the specified single electrode potential limits. For the purposes of this discussion, we consider the common case where the negative electrode potential satisfies $V_- \ge V_{target}$.

Figure 8:
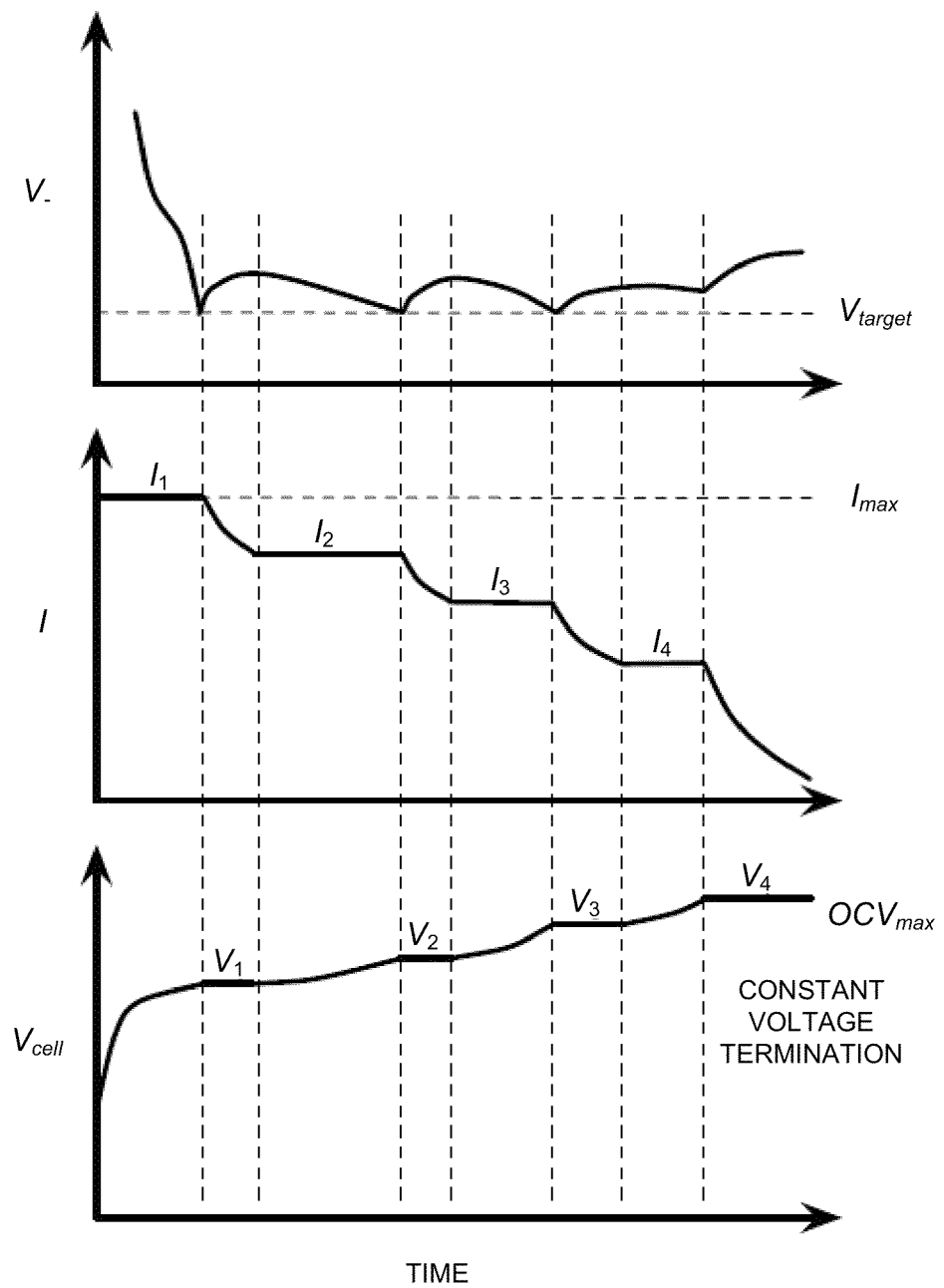
FIG. 8 illustrates the process of constructing a discrete I-V-T charging profile in accordance with an embodiment of the present invention.

Beginning at the bottom of charge, we charge at the first current until the measurement or estimate of $V_-$ (with any applied adjustments) drops to $V_{target}$. Then, we note the cell voltage and charge at that voltage until the current drops to the next level, which begins the next constant-current phase. This procedure is repeated until the cell voltage reaches $OCV_{max}(T)$, and charging is completed via constant voltage tapering to $I_{term}$. FIG. 8 illustrates this process. Note that the pre-selected current limits $\{I_i\}$ are used to find the voltage limits $\{V_i\}$. Following this technique for a set of temperatures covering a specified range for charging yields a set of discrete profiles that can be used to charge cells.

Automatic construction is not limited to determining profiles with decreasing current limits. For example, we can instead charge the cell under test in such a way as to maintain $V_-$ within some range $\Delta V$ above $V_{target}$. During a constant-current phase, we can then step back to a higher current if $V_- \le V_{target} + \Delta V$. Further refinements can be made, but taking this approach to the logical extreme, we arrive once again at closed-loop feedback control of the electrode potentials. (This closed-loop feed back control is described in more detail in U.S. patent application Ser. No. 12/242,700, filed 30 Sep. 2008, entitled "Adaptive Surface Concentration Battery Charging," by inventors Thomas C. Greening, P. Jeffrey Ungar and William C. Athas.)

Screening Cells

Once the I-V-T charging scheme and technique are in place, one embodiment of the present invention provides an effective procedure for charging typical cells. In principle, these cells can vary in capacity and in small internal impedances with little effect. On the other hand, cells will vary in other ways within a population of the same type, and a screening process is desirable to ensure that production cells will charge as intended. For example, variations in porous electrode characteristics can result in significant variations in lithium transport rates that should be accounted for.

The cell-adaptive charging profiles described previously once again provide the necessary information. The cell-adaptive profiles can be represented as trajectories (V(T), I(T), q(T)). One embodiment of the invention constructs a scheme (V'(T), I'(T)) as discrete points toward the less aggressive region in the I-V plane, and provides associated techniques to charge. An excellent way to check if a cell under charge is conservative versus the (V(T), I(T), q(T)) trajectories is to perform a comparison in the V-q plane, because the state of charge q is the primary variable in predicting the charging voltage limits. A sample cell A which is subjected to the devised I-V-T scheme follows trajectories (V'(T), I'(T), $q'_A$(T)). For a cell to pass the screen, the trajectories must satisfy $$q'_A(V'(T)) \ge q(V'(T)) \quad (6)$$

which means that the state of charge that cell A reaches at a voltage V' must be greater than or equal to the state of charge reached on the typical cell-adaptive trajectory for the same voltage. This is another way of stating that the trajectory for the cell A must lie below the nominal one, as was illustrated in FIG. 4. This condition can form an effective and practical screen, since the equipment used to screen cells can easily monitor the state of charge with sufficient accuracy (using the method described above, for instance) to make the comparison meaningful. To simplify matters, a comprehensive screen need only check that Eq. (6) holds at the discrete voltage limits and temperatures in Eq. (2), i.e., $$q'_A(V_{ji}) \ge q(V_{ji}) \quad (7)$$

If the yield of cells passing the screen is judged to be too low, then there are three likely possibilities: (1) the spread in cell transport properties is too large, (2) the cell-adaptive profiles were obtained from cells that were faster than typical cells, or (3) the devised I-V-T charging scheme is too aggressive for the population as a whole. The first possibility can be addressed through manufacturing process improvements, but the screen can provide a metric. The second possibility can be addressed through measurements on more cells. The third possibility can be addressed by tuning the I-V-T scheme to adjust the yield upwards. One easy way to do this is to adjust the current limits to be somewhat smaller, because this will cause the transport-related overpotentials to decrease, and therefore the state of charge reached at each voltage limit will increase.

Figure 11:
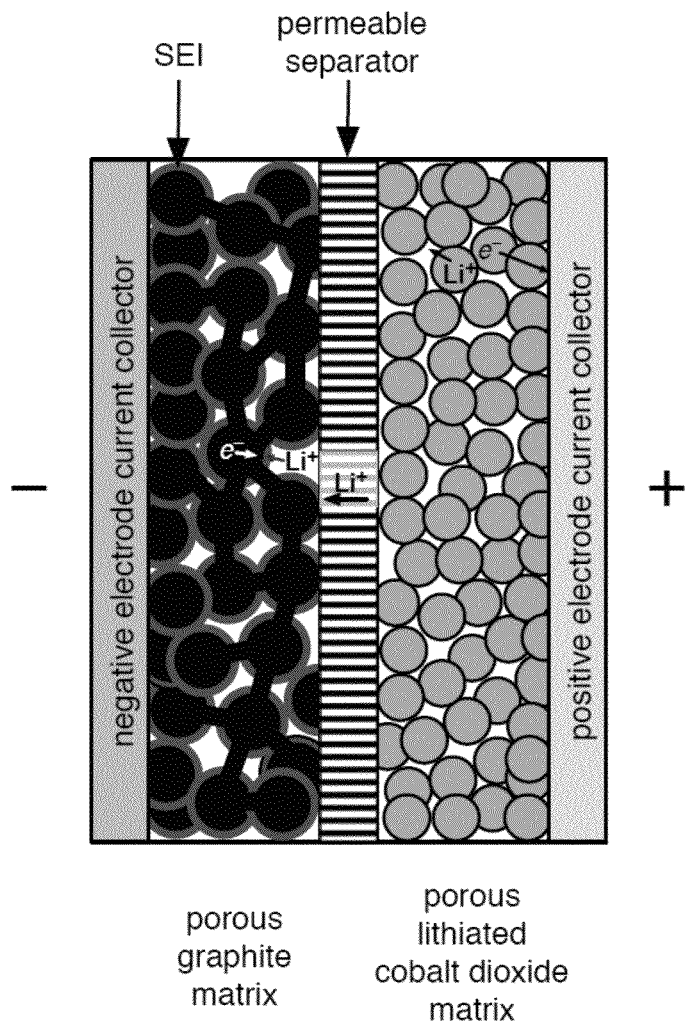
FIG. 11 illustrates a rechargeable battery in accordance with an embodiment of the present invention.

FIG. 11 illustrates a rechargeable battery 1100 in accordance with an embodiment of the present invention. Battery 1100 includes a battery cell 1102. It also includes a current meter (current sensor) 1104, which measures a charging current applied to cell 1102, and a voltmeter (voltage sensor) 1106, which measures a voltage across cell 1102. Battery 1100 also includes a thermal sensor 1130, which measures the temperature of battery cell 1102. (Note that numerous possible designs for current meters, voltmeters and thermal sensors are well-known in the art.)

Rechargeable battery 1100 also includes a current source 1123, which provides a controllable constant charging current (with a varying voltage), or alternatively, a voltage source 1124, which provides a controllable constant charging voltage (with a varying current).

The charging process is controlled by a controller 1120, which receives: a voltage signal 1108 from voltmeter 1106, a current signal 1110 from current meter 1104 a temperature signal 1132 from thermal sensor 1130 and a state of charge (SOC) value 1132 from SOC estimator 1130. These inputs are used to generate a control signal 1122 for current source 1123, or alternatively, a control signal 1126 for voltage source 1124.

During operation, SOC 1132 estimator receives a voltage 1108 from voltmeters 1106, a current from current meter 1104 and a temperature from thermal sensor 1130 and outputs a state of charge value 1132.

Note that controller 1120 can be implemented using either a combination of hardware and software or purely hardware. In one embodiment, controller 1120 is implemented using a microcontroller, which includes a microprocessor that executes instructions which control the charging process.

Figure 12:
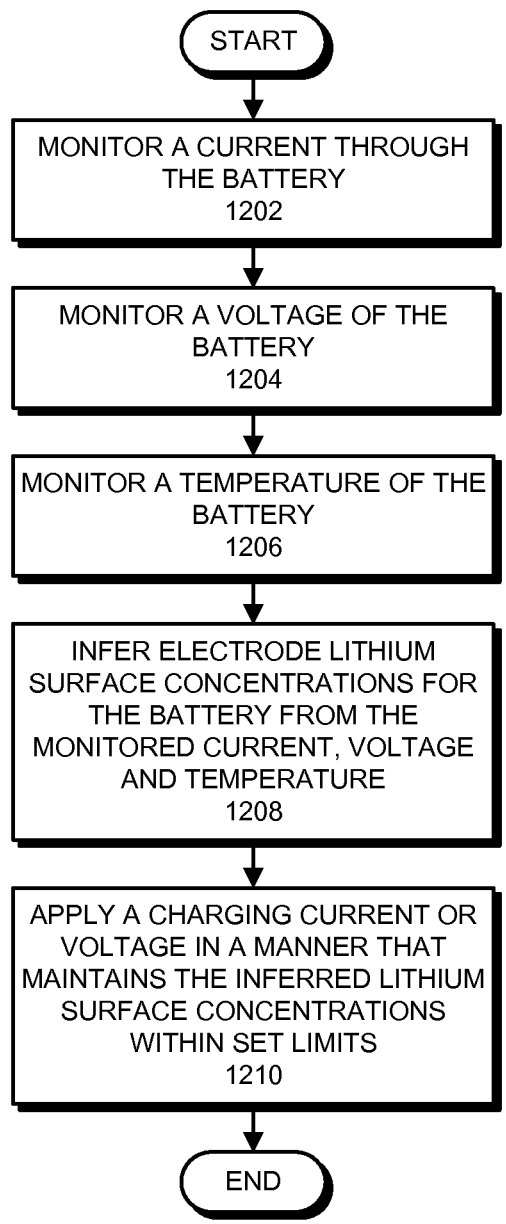
FIG. 12 presents a flow chart illustrating the process of charging a battery in accordance with an embodiment of the present invention.

FIG. 12 presents a flow chart illustrating the process of charging a battery in accordance with an embodiment of the present invention. During operation, the system monitors: a current through the battery (step 1202), a voltage of the battery (step 1204), and a temperature of the battery (step 1206). Next, the system infers electrode lithium surface concentrations for the battery from the monitored current, voltage, and temperature (step 1208). The system then applies the charging current and/or the charging voltage in a manner that maintains the inferred electrode lithium surface concentrations within set limits (step 1210).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for charging a battery, wherein the battery is a lithium-ion battery, the method comprising:
monitoring a current through the battery;
monitoring a voltage of the battery;
monitoring a temperature of the battery;
inferring electrode lithium surface concentrations for the battery from the monitored current, voltage and temperature; and
applying the charging current and/or the charging voltage in a manner that maintains the inferred electrode lithium surface concentrations for the battery within set limits, wherein maintaining the inferred electrode lithium surface concentrations for the battery within set limits comprises:
  receiving a charging profile comprising a set of data points, wherein each data point specifies a current, a voltage and a temperature for the battery, wherein the specified current, voltage and temperature are associated with a maximum lithium surface concentration for the battery during the charging process;
  using interpolation to compare the monitored current, temperature and voltage of the battery against a surface defined by the set of data points, wherein the surface is associated with the maximum lithium concentration of the battery; and
  using results of the comparison to adjust the charging current and/or the charging voltage to maintain the electrode lithium surface concentrations of the battery below the maximum lithium surface concentration during the charging process.

2. The method of claim 1, wherein inferring the electrode lithium surface concentrations involves determining potentials for one or more working electrodes with respect to a reference electrode, which can include a metallic lithium electrode, wherein the determined potentials are correlated with the electrode lithium surface concentrations; and
  wherein applying the charging current and/or the charging voltage involves using the determined potentials for the one or more working electrodes to adjust the charging current and/or the charging voltage to maintain the potentials of the one or more working electrodes at levels which keep the electrode lithium surface concentrations within the set limits.

3. The method of claim 2, wherein maintaining the potentials of the one or more working electrodes involves maintaining either a maximum potential or a minimum potential which keeps the electrode lithium surface concentrations within the set limits.

4. The method claim 1, wherein adjusting the charging current and/or the charging voltage involves:
  applying a constant charging current to the battery until the monitored voltage reaches a maximum voltage, wherein the maximum voltage maintains the electrode lithium surface concentrations of the battery below the maximum lithium surface concentration given the constant charging current and the monitored temperature; and/or
  applying a constant charging voltage to the battery until the monitored current reaches a lower current, wherein the lower current maintains the electrode lithium surface concentrations of the battery below the maximum lithium surface concentration given the constant charging voltage and the monitored temperature.

5. The method claim 1, wherein prior to receiving the charging profile, the method further comprises generating the charging profile by taking measurements, including voltage, current and temperature, while charging a reference battery, which is similar to the battery, wherein the measurements are used to estimate the electrode lithium surface concentrations of the battery during the charging process.

6. The method of claim 5,
  wherein taking the measurements involve determining the potentials of working electrodes in the reference battery with respect to a reference electrode, which can include a metallic lithium reference electrode; and
  wherein estimating the electrode lithium surface concentrations involves using the determined working electrode potentials with respect to the reference electrode to estimate the electrode lithium surface concentrations.

7. The method of claim 6, wherein determining the potentials of the working electrodes with respect to the reference electrode involves directly measuring the potentials of the working electrodes with respect to an integral reference electrode built into a cell in the reference battery.

8. The method of claim 6, wherein determining the potentials of the working electrodes with respect to the reference electrode involves:
  determining a state of charge for the reference battery; and
  determining the potentials of the working electrodes with respect to the reference electrode from the determined state of charge and other parameters related to the reference battery.

9. The method of claim 1, wherein the battery is a lithium-ion battery which includes:
  a transport-limiting electrode;
  an electrolyte;
  a separator permeated with the electrolyte; and
  a non-transport-limiting electrode.

10. The method of claim 9,
  wherein the transport-limiting electrode is a negative electrode; and
  wherein the non-transport-limiting electrode is a positive electrode.

11. The method of claim 9,
  wherein the negative electrode is comprised of graphite and/or $TiS_2$;
  wherein the electrolyte is a liquid electrolyte comprised of $LiPF_6$, $LiBF_4$ and/or $LiClO_4$ and an organic solvent; and
  wherein the positive electrode is comprised of $LiCoO_2$, $LiMnO_2$, $LiFePO_4$ and/or $Li_2FePO_4F$.

12. A battery with a charging mechanism, comprising:
  the battery;
  a voltage sensor configured to monitor a voltage of the battery;
  a current sensor configured to monitor a current through the battery;
  a temperature sensor configured to monitor a temperature of the battery;
  a charging source configured to apply a charging current and/or a charging voltage to the battery; and
  a controller configured to receive inputs from the voltage sensor, the current sensor and the temperature sensor, and to send a control signal to the charging source;
  wherein the controller is configured to,
    infer electrode lithium surface concentrations for the battery from the monitored current, voltage and temperature, and
  apply the charging current and/or the charging voltage in a manner that maintains the inferred electrode lithium surface concentrations for the battery within set limits, wherein maintaining the inferred electrode lithium surface concentrations for the battery within set limits comprises:
    receiving a charging profile comprising a set of data points, wherein each data point specifies a current, a voltage and a temperature for the battery, wherein the specified current, voltage and temperature are associated with a maximum lithium surface concentration for the battery during the charging process;
    using interpolation to compare the monitored current, temperature and voltage of the battery against a surface defined by the set of data points, wherein the surface is associated with the maximum lithium concentration of the battery; and
    using results of the comparison to adjust the charging current and/or the charging voltage to maintain the electrode lithium surface concentrations of the battery below the maximum lithium surface concentration during the charging process.

13. The battery of claim 12, wherein while inferring the electrode lithium surface concentrations, the controller is configured to determine potentials for one or more working electrodes with respect to a reference electrode, which can include a metallic lithium electrode, wherein the determined potentials are correlated with the electrode lithium surface concentrations; and wherein while applying the charging current and/or the charging voltage, the controller is configured to use the determined potentials for the one or more working electrodes to adjust the charging current and/or the charging voltage to maintain the potentials of the one or more working electrodes at levels which keep the electrode lithium surface concentrations within the set limits.

14. The battery of claim 13, wherein while maintaining the potentials of the one or more working electrodes, the controller is configured to maintain either a maximum potential or a minimum potential which keeps the electrode lithium surface concentrations within the set limits.

15. The battery of claim 12, wherein the controller is configured to:
apply a constant charging current to the battery until the monitored voltage reaches a maximum voltage, wherein the maximum voltage maintains the electrode lithium surface concentrations of the battery below the maximum lithium surface concentration given the constant charging current and the monitored temperature; and/or
apply a constant charging voltage to the battery until the monitored current reaches a lower current, wherein the lower current maintains the electrode lithium surface concentrations of the battery below the maximum lithium surface concentration given the constant charging voltage and the monitored temperature.

16. The battery of claim 12, wherein the charging profile was previously generated by taking measurements, including voltage, current and temperature, while charging a reference battery, which is similar to the battery, and wherein the measurements were used to estimate the electrode lithium surface concentrations of the battery during the charging process.

17. The battery of claim 12, wherein the battery is a lithium-ion battery which includes:
a transport-limiting electrode;
an electrolyte;
a separator permeated with the electrolyte; and
a non-transport-limiting electrode.

18. The battery of claim 17,
wherein the transport-limiting electrode is a negative electrode; and
wherein the non-transport-limiting electrode is a positive electrode.

19. The battery of claim 18,
wherein the negative electrode is comprised of graphite and/or $TiS_2$;
wherein the electrolyte is a liquid electrolyte comprised of $LiPF_6$, $LiBF_4$ and/or $LiClO_4$ and an organic solvent; and
wherein the positive electrode is comprised of $LiCoO_2$, $LiMnO_2$, $LiFePO_4$ and/or $Li_2FePO_4F$.

20. A charging mechanism for a battery, comprising:
a voltage sensor configured to monitor a voltage of the battery;
a current sensor configured to monitor a current through the battery;
a temperature sensor configured to monitor a temperature of the battery;
a charging source configured to apply a charging current and/or a charging voltage to the battery; and
a controller configured to receive inputs from the voltage sensor, the current sensor and the temperature sensor, and to send a control signal to the charging source;
wherein the controller is configured to,
infer electrode lithium surface concentrations for the battery from the monitored current, voltage and temperature, and
apply the charging current and/or the charging voltage in a manner that maintains the inferred electrode lithium surface concentrations for the battery within set limits, wherein maintaining the inferred electrode lithium surface concentrations for the battery within set limits comprises:
receiving a charging profile comprising a set of data points, wherein each data point specifies a current, a voltage and a temperature for the battery, wherein the specified current, voltage and temperature are associated with a maximum lithium surface concentration for the battery during the charging process;
using interpolation to compare the monitored current, temperature and voltage of the battery against a surface defined by the set of data points, wherein the surface is associated with the maximum lithium concentration of the battery; and
using results of the comparison to adjust the charging current and/or the charging voltage to maintain the electrode lithium surface concentrations of the battery below the maximum lithium surface concentration during the charging process.

21. The charging mechanism of claim 20, wherein while inferring the electrode lithium surface concentrations, the controller is configured to determine potentials for one or more working electrodes with respect to a reference electrode, which can include a metallic lithium electrode, wherein the determined potentials are correlated with the electrode lithium surface concentrations; and wherein while applying the charging current and/or the charging voltage, the controller is configured to use the determined potentials for the one or more working electrodes to adjust the charging current and/or the charging voltage to maintain the potentials of the one or more working electrodes at levels which keep the electrode lithium surface concentrations within the set limits.

22. The charging mechanism of claim 21, wherein while maintaining the potentials of the one or more working electrodes, the controller is configured to maintain either a maximum potential or a minimum potential which keeps the electrode lithium surface concentrations within the set limits.

23. The charging mechanism of claim 20, wherein the controller is configured to:
apply a constant charging current to the battery until the monitored voltage reaches a maximum voltage, wherein the maximum voltage maintains the electrode lithium surface concentrations of the battery below the maximum lithium surface concentration given the constant charging current and the monitored temperature; or
apply a constant charging voltage to the battery until the monitored current reaches a lower current, wherein the lower current maintains the electrode lithium surface concentrations of the battery below the maximum lithium surface concentration given the constant charging voltage and the monitored temperature.

24. The charging mechanism of claim 20, wherein the charging profile was previously generated by taking measurements, including voltage, current and temperature, while charging a reference battery, which is similar to the battery, wherein the measurements were used to estimate the electrode lithium surface concentrations of the battery during the charging process.

* * * * *